United States Patent [19]

Romaine et al.

[11] Patent Number: 5,427,592
[45] Date of Patent: * Jun. 27, 1995

[54] INTACT SEED-BASED DELAYED-RELEASED NUTRIENT SUPPLEMENT FOR MUSHROOM CULTIVATION

[75] Inventors: C. Peter Romaine, State College, Pa.; Alan Marlowe, Salem, Oreg.

[73] Assignee: The Penn State Research Foundation, University Park, Pa.

[*] Notice: The portion of the term of this patent subsequent to Mar. 8, 2011 has been disclaimed.

[21] Appl. No.: 120,890

[22] Filed: Sep. 13, 1993

Related U.S. Application Data

[63] Continuation-in-part of Ser. No. 943,669, Sep. 11, 1992, Pat. No. 5,291,685.

[51] Int. Cl.⁶ .......................... A01G 1/04; C05F 11/00
[52] U.S. Cl. .............................................. 47/1.1; 71/5
[58] Field of Search ......................... 47/1.1, 57.6; 71/5

[56] References Cited

U.S. PATENT DOCUMENTS

| | | | |
|---|---|---|---|
| 3,942,969 | 3/1976 | Carroll, Jr. et al. | 71/5 |
| 4,370,159 | 1/1983 | Holtz | 71/5 |
| 4,534,781 | 8/1985 | Wu et al. | 71/5 |
| 4,617,047 | 10/1986 | Bretzloff | 71/5 |
| 4,646,466 | 3/1987 | Olah | 47/1.1 |
| 4,803,800 | 2/1989 | Romaine et al. | 47/1.1 |
| 5,291,685 | 3/1994 | Romaine et al. | 47/1.1 |

OTHER PUBLICATIONS

Olson, et al., "Nutritional Quality of Cereal Grains", Genetic and Agronomic Improvement–Agronomy Monograph No. 28, p. 83 (1987).
Walsh, "Developing Yield Potential of Cereals", Cereal Production, p. 69 (1982).
Weiss, Oilseed Crops, Table of Contents and p. 7 (1983).
Robbelen, et al., Oil Crops of the World, Table of Contents (1989).
Murphy, et al., Biochem J., vol. 258, pp. 285–293 (1989).
L. C. Schisler, Appl. Ag. Res, vol. 5, No. 1, pp. 44–87 (1990).
Carroll, Jr., et al., Applied and Environmental Microbiology, 31:4, pp. 499–503 (1976).
G. Fritsche (1978) In: The Biology and Cultivation of Edible Mushrooms, S. T. Chang et al, eds, pp. 244–246.

*Primary Examiner*—David T. Fox
*Assistant Examiner*—Bruce Campell
*Attorney, Agent, or Firm*—Thomas J. Monahan

[57] ABSTRACT

There is provided a method of cultivating mushrooms and mushroom spawn, wherein a delayed-release nutrient supplement is utilized. The method is an improvement over prior methods which utilize nutrient supplements in the growing of mushrooms and mushroom spawn. The improvement comprises using as a nutrient supplement an intact seed having its sprouting capability irreversibly inhibited or destroyed, or mixtures thereof, and having inherent delayed-release properties.

29 Claims, 4 Drawing Sheets

INTACT SEED-BASED DELAYED-RELEASED NUTRIENT SUPPLEMENT FOR MUSHROOM CULTIVATION

The present application is a Continuation-in-Part of U.S. patent application Ser. No. 07/943,669 filed on Sep. 11, 1992, now U.S. Pat. No. 5,291,685, issued Mar. 8, 1994, which is incorporated herein by reference in its entirety.

TECHNICAL FIELD

The present invention relates generally to the field of mushroom cultivation and more particularly to an environmentally-compatible, intact seed-based, delayed-released nutrient supplement for mushrooms, a process for making same, and a process for utilizing same in the cultivation of mushrooms.

BACKGROUND OF THE INVENTION

Fungi are microscopic, spore-bearing organisms that lack chlorophyll and therefore derive nourishment from dead or living organic matter [Alexopoulos, C. J., e al., *Introductory Mycology* (1979), Chapter 1]. Because they share characteristics of both plants and animals, they are classified separately in the Kingdom Myceteae. Within this Kingdom, there are the "filamentous fungi," so named because their vegetative bodies consist of small filaments referred to as "hyphae." Typically, the hyphae grow in a branching fashion, spreading over or within the substrate used as the source of nourishment, thereby forming a network of hyphae called "mycelium." In the life cycle of most filamentous fungi, the mycelium gives rise to either asexual or sexual reproductive bodies bearing spores. The spore is functionally comparable to the seed of higher plants, being important in the dispersal and survival of the fungus in nature. Under suitable environmental conditions, the spore germinates to form another generation of hyphae and so completing the life cycle of the fungus.

Perhaps filamentous fungi are best known for their edible, fleshy, spore-bearing, reproductive structures called "mushrooms." Mushrooms have been grown commercially for many years. Throughout these years, commercial production of cultivated mushrooms has increased dramatically. In 1939, worldwide production of *Agaricus bisporus* (=*A. brunnescens*), the most popular of the edible cultivated mushrooms, was 46,000 tons. By 1982, such production was in excess of 850,000 tons [Flegg, P. B. and Wood, D. A., *The Biology and Technology of the Cultivated Mushroom*, Chapter 1, p. 7 (1985)].

The common edible mushroom (e.g., *A. bisporus*) has both vegetative and reproductive ("fruiting") forms. The form most familiar to consumers is the fruiting form (i.e., mushroom), which has a stalk and an umbrella shaped cap. The life cycle of this mushroom fungus begins with the germination of a spore, which produces hyphae. A collection of hyphae compact together and form the mycelium. The mycelium then grows and invades the environment as networks, Small masses at the periphery of the network of mycelium enlarge and differentiate to form immature mushrooms called "buttons." The buttons rapidly enlarge and burst through the soil and become mature mushrooms. Mushrooms are produced from mycelium in cycles referred to as "breaks" or "flushes." A single population of mycelium may produce multiple breaks. The mushrooms then produce spores which germinate and produce further mycelium.

Methods of commercial mushroom cultivation are well known and generally involve inoculating beds or trays of compost with mushroom spawn. Such compost is rich in nutrients and capable of supporting the mushroom fruiting stage. As used herein, the term "spawn" refers to a nutrient substrate, typically rye or millet, colonized by mycelium. In the process referred to as "spawning," the spawn is mixed with compost to promote growth of the mycelium throughout the compost. The compost is usually comprised of straw-bedded horse manure or other combinations of fibrous plant material. Several weeks after spawn dissemination, when the compost has been sufficiently colonized by the fungus, the compost is covered with a thin layer of "casing soil" (e.g., peat, soil). This process is called "casing." Within weeks of casing, mushrooms develop and are harvested in breaks. U.S. Pat. No. 4,803,800 is related to same.

Owing to its stimulatory effect on the yield of mushrooms, the addition of protein-rich, lipid-rich supplements (generally soybean meal) to the compost has become a widespread practice in the commercial cultivation of the button mushroom, *A. bisporus*. Typically, supplements are added at the time when the compost is inoculated with the mushroom fungus (e.g., supplementation of spawning). Supplements may also be mixed with the compost at casing (e.g., supplementation at casing). In yet another variation on the time of supplementing, supplements can be added during the mushroom production cycle.

A salient feature of commercial supplements is that the availability of nutrients is delayed until the mushroom fungus has thoroughly invaded the compost, thereby minimizing early utilization by competitive microorganisms within the compost. The state-of-the-art mechanism of delayed-release involves formaldehyde-denaturation of the protein (Spawn Mate Co.) and encasing the protein in a water-repellent film containing the fungicide Mertect (Thiabendazole) (Campbell Soup Co.). [These techniques are disclosed in U.S. Pat. Nos. 3,942,969; 4,370,159; 4,534,781; and 4,617,047]. However, because these materials contain biohazardous chemicals, their future in the mushroom industry is tenuous. Formaldehyde has been restricted by the Environmental Protection Agency and California now requires the routine monitoring of workers handling Spawn Mate for exposure to formaldehyde. Campbell Soup's supplement was temporarily banned in Canada. Considering the emerging trend towards the reduced usage of chemicals in agriculture, there is an urgent need to develop an environmentally-safe, delayed-release supplement for mushrooms. The present invention overcomes the above-described disadvantages inherent with various compositions and methods of the art. The invention presents compositions, methods for their preparation and use, which permit safe, economical, and convenient application in the commercial production of mushrooms.

SUMMARY OF THE INVENTION

The invention is based upon the unexpected observation that the intact seed of certain plant oilseed species and allied species [e.g., rape (=rapeseed), flax, mustard, radish, sunflower, cabbage, sesame, and like species], having been treated to cause a loss in their ability to germinate, are capable of functioning as delayed-released nutrient supplements for increasing the yield of mushrooms in commercial cultivation. In accordance with the present invention based upon this observation, intact seeds, preferably an oilseed, and most preferably rape, are treated to prevent sprouting and thereafter used as a mushroom nutrient supplement. Preferably, the seed is heated, (e.g., 195° F. for 24 hours) to destroy germination capability. The resulting product is a non-composted intact seed-based naturally-occurring delayed-released nutrient supplement that is suitable for use in commercial mushroom production. The invention differs significantly from prior practices that used chemicals (e.g., formaldehyde) to delay the release of nutrients.

The invention may be practiced by adding a treated seed species (e.g., an oilseed species), or a mixture of such species, to the compost thereby increasing the yield of mushrooms in a manner similar to the prior art chemical-based supplements. With the formulations of the invention, however, no harmful chemicals are required in its preparation. In the preferred practice, only a heat treatment is used to inhibit sprouting of the seed species chosen.

Although the reasons for the success of the present invention are not known, it is expected that the treatment of seed compositions of the invention to remove or inhibit their ability to germinate may or may not be lethal to the seed in the composition. It is also expected that large-scale manufacturing using intact seed-based nutrient supplements of the invention would be more economical than prior art supplements. Compositions of the invention are also expected to be environmentally safe and are inherently less biohazardous to manufacture and utilize than existing commercial supplements that utilize chemical denaturants/antimicrobial protectants.

OBJECTS OF THE INVENTION

It is therefore an objective of this invention to provide an environmentally-compliant delayed-release nutrient supplement for use in mushroom cultivation.

A further object of this invention is to provide an economical intact seed-based nutrient supplement for increasing the yield of mushrooms grown commercially.

It is yet a further objective of this invention to provide an intact seed-based nutrient substrate for the preparation of mushroom spawn.

Advantages of the present invention over the prior art and a better understanding of the invention and its use will become more apparent from the following disclosure in conjunction with the accompanying drawings wherein there are set forth fully, by way of illustration and example, certain embodiments of the invention.

THE DRAWINGS

The present invention will become more fully understood from the detailed description given here and below and the accompanying drawings which are given by way of illustration only, and thus, are not limitative of the present invention, and wherein:

FIGS. 1 and 4 are line graphs comparing the temperature profiles in the compost during spawn run for various forms of supplements; and FIGS. 2 and 3 are bar graphs comparing the yield for various supplements.

DETAILED DESCRIPTION OF THE INVENTION

Figure 1:
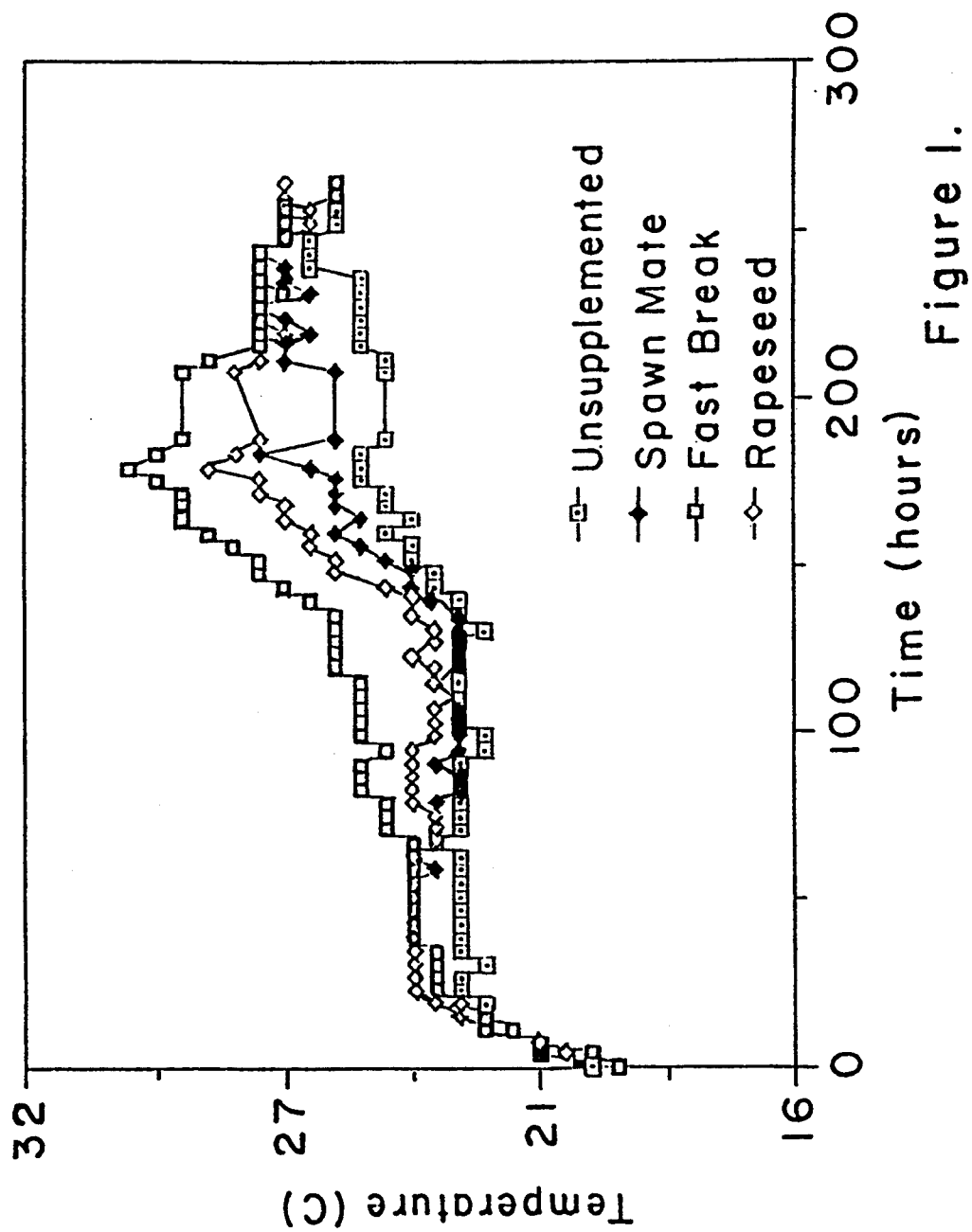

The following detailed description is being provided as an aid to those desiring to practice the present invention. The following detailed description is not to be construed as limiting to the present inventive discovery, instead the present invention is only limited by the scope of the claims appended hereto and the equivalents thereof.

The present inventive methods are preferably practiced by treating essentially intact whole seed obtained from any suitable source, such that the capability of seed sprouting associated therewith is essentially removed. In general, the intact seed is viewed as substantially free of damage other than that normally associated with harvesting and post-harvest handling and distribution. In a highly preferred embodiment of the invention, the chosen seed when treated, possesses the ability to timely make available to cultivated mushroom fungus its nutrient reserve within a period of about 3 weeks.

The factors which govern whether or not a specific seed species will be an effective seed-based nutrient supplement when utilized according to the present invention are to some extent theorized. However, several determinants which are believed to be linked to the effectiveness of the seed of a chosen plant species are the composition of its seed-stored nutrient reserve, the nature of the seed coat and the size of the seed.

The composition of the chosen seed's nutrient reserve is important. For example, oilseeds are preferred when one considers the relatively high content of oil including the types and amounts of lipids that are available as a nutrient source (e.g., triacylglycerols, phospholipids, glycolipids, and the like), and the amount of protein including the amino acid profile and relative amounts of each amino acid comprising said protein. On the other hand, typical cereal seeds (e.g., rye, millet, and the like) are less preferred with respect to their ability to increase the yield of mushrooms probably because they typically have a lower content of oil.

It is believed that the nature of the seed coat is an important determinant of whether or not a chosen seed will be a commercially valuable and effective delayed release nutrient supplement for use in mushroom cultivation. For example, even though a coconut is an oilseed species and may possess an effective nutrient reserve, its seed coat is such that it would probably not be breached by the mushroom fungus within the time frame of a mushroom spawn growth period (about 2–3 weeks). Thus, while a given seed may be an excellent source of nutrients, if its seed coat is relatively impenetrable, it may be a poor supplement if utilized in the methods of the present invention. Reasons for an impenetrable seed coat include physical properties (i.e., the coat being too hard or too thick), and chemical properties (i.e., the coat contains compounds that retard its degeneration). Accordingly, the seed species that are preferred as mushroom supplements when practicing the present invention, include those having a seed coat composition that allows for the timely-availability of the seed-stored nutrient reserve, within a desired time frame, during a period of mushroom cultivation.

Exemplary of a delayed-release intact-seed nutrient supplement which has a seed coat allowing for a timely release of the nutrient reserve present in the seed, are those which allow the nutrient reserve of the seed to release within about a 3 week period of time, during a mushroom fungus colonization of a compost (i.e., spawn run).

As indicated above, the size of the seed species chosen can also be a determinant as to the effectiveness a given seed will have when utilized in the present invention. For example, the use of a coconut as a delayed release nutrient supplement in the present invention, would not be expected to be efficient from a size standpoint alone, notwithstanding discussions relating to its seedcoat. This is because in the present invention, it is preferred to utilize seeds that can be uniformly and thoroughly distributed in the mushroom compost. Also, smaller seeds have a higher ratio of surface area to nutrient reserve, which improves the availability of the seed-stored nutrients to the mushroom fungus. Accordingly, in a most preferred embodiment of the present invention, the seed of the plant species utilized possesses a maximal dimensional size of about 0.1 to 2.5 cm.

Many different varieties and species of seeds can be used in the present invention to provide an advantageous and beneficial nutrient supplement for cultivating mushrooms. Suitable oilseeds should have at least one or more of the described characteristics noted above, so that excellent results can be obtained. Nonetheless, if an intact seed is treated according to the present invention and utilized as a nutrient supplement in the compost for the production of mushrooms, or in the preparation of mushroom spawn, its use in such a fashion is encompassed by the present invention.

Preferred seeds to use in the present invention include many oilseeds, presumably due to their high oil content and other undetermined inherent properties. In this regard, for a general discussion on oilseeds, including their production, see *Oilseed Crops*, by E. A. Weiss, Longman Publishing (1983), and *Oil Crops of the World, their Breeding and Utilization*, Edited by Gerhard Robbelen, e al., McGraw-Hill Publishing (1989).

It is noted that when intact seed of a non-oilseed plant species is treated according to the present invention and utilized as a nutrient supplement in the cultivation of mushrooms, the use of such seed can be highly preferred if its nutrient reserve, seed coat and size of seed are such that one can obtain therewith a timely availability of the nutrient reserve from the treated seed within a period of about 3 weeks, when the seed is utilized as a delayed-release nutrient supplement in the production of mushrooms or preparation of mushroom spawn. Similarly, even though oilseeds are generally preferred in the present invention, a chosen oilseed may not provide adequate or advantageous results if it has an unsatisfactory nutrient reserve and/or it does not release its nutrient reserve within a period of about 3 weeks when it is used as a nutrient supplement in the methods of the present invention.

For example, in the Examples section hereof (see Example 9), it is shown that when the cereal grain seeds, rye and millet, were utilized as a mushroom supplement, after treatment to irreversibly inhibit their sprouting capability, only rye provided some improvement over the unsupplemented compost control. However the improvement obtained with the treated rye seeds was well below that obtained with the commercial supplement Spawn Mate II SE containing the chemical formaldehyde. On the otherhand, several oilseed species or their relatives, namely, flax, rape, mustard, radish, oil sunflower, cabbage, and sesame gave an improvement that was equal or superior to Spawn Mate II SE. Example 9 also shows that the oilseed species corn and safflower failed to produce results as good as the control group, when they were used as delayed-release nutrient supplements.

The poor results obtained with the treated rye and millet seeds in Example 9 are believed to be due to the seed's failure to possess good determining characteristics, like those outlined above. Namely, it is believed that the rye and millet seeds provided poor results because the composition of the nutrient reserve therein was not appropriate for achieving a markedly stimulatory effect on mushroom yield, and/or their seed coats where not appropriate to allow for a timely release of the nutrient composition in an advantageous 3 week time frame. The poor results obtained with the corn and safflower oilseeds tested in Example 9 are believed to be due to relatively inpenetrable seed coats.

Those skilled in the art desiring to practice the present invention, should understand that while the present invention is described in many respects to the preferred use of treated oilseeds as a delayed-release supplement in the growing of mushrooms, it also pertains to the use of other types of seeds (e.g., non-oilseeds) as delayed-release nutrient supplements. This is particularly true where the intact non-oilseed, when treated utilizing one of the treatment methods discussed herein, acts as a delayed-release nutrient supplement that is about at least as effective as Spawn Mate II SE, utilized in Example 9, when tested according to the procedure outlined herein.

A preferred oilseed to utilize in the methods of the present invention should also be about at least as effective as Spawn Mate II SE, utilized in Example 9, when tested according to the procedure outlined herein.

One of the most preferred oilseeds to utilize in the present invention is a CANOLA variety of rapeseed referred to as "Reward" obtained from Wilbur Ellis Company, Southwest Feed Division, Los Angeles, Calif. CANOLA is the name given to a group of rapeseed (*Brassica rapa* [=*B. campestris*] and *B. napus*) varieties that have been bred to contain low levels of erucic acid and glucosinolates. "CANOLA" is an acronym for CANADA OIL LOW ACID. It is a trademark name owned by the Canola Council of Canada. Only varieties of rapeseed that are low in these compounds are designated double zero ("00"). So CANOLA are "00" varieties of rapeseed, with all CANOLA being rapeseed, however, not all rapeseed being CANOLA. CANOLA is used as a source of oil for human consumption and for CANOLA meal used as an animal or poultry feed. In contrast, the oil of other varieties of rapeseed, which are high in erucic acid-and glucosinolates, find applications as industrial lubricants. The Proceedings of the International Canola Conference, Apr. 2-6, 1990 at Atlanta, Ga., contain a discussion of CANOLA in the paper "*Canola A World Class Crop*", by S. E. Younts. The details of Mr. Younts' paper are incorporated herein by reference in their entirety.

The present invention works with CANOLA varieties of rapeseed, and varieties of rapeseed that are high or low in erucic acid and high or low in glucosinolates (non-CANOLA varieties) also should be effective. For example, we provide evidence that several varieties of CANOLA and/or species of rapeseed or mixtures thereof grown commercially at this time, can be utilized in the present invention and provide an effective nutrient supplementation for increasing the yield of mushrooms. Also, our data indicate that other plant species within the same family as rape (mustard family) as well as species in other plant families or mixtures thereof, which are oilseed species, can be advantageously utilized in the present invention.

Other oilseed species might achieve the same effect as described here for rapeseed including but not limited to:

| | |
|---|---|
| Arachis spp. | Brassica adpressa |
| B. campestris | B. chinensis |
| B. carinata | B. fruticulosa |
| B. hirta | B. integrifolia |
| B. juncea | B. napus |
| B. nigra | B. oleracea |
| B. tournefortii | Calendulm officinalis |
| Camelina sativa | Carthamus spp. |
| Centranthus macrosiphon | Ceratotheca sesamoides |
| Crambe spp. | Crepis alpina |
| Cuphea spp. | Dimorphotheca plurialis |
| Diplotaxis erocoides | Elaeis spp. |
| Eruca sativa | Euphorbia spp. |
| Glycine spp. | Gossypium spp. |
| Guizotia spp. | Helianthus spp. |
| Impatiens balsamina | Lesguerella fendler |
| Limnanthes alba | Linum spp. |
| Medicago sativum | Papaver spp. |
| Olea european | Ricinus spp. |
| Raphanus sativus | Simmondsia spp. |
| Sesamum spp. | S. avernsis |
| Sinapis alba | |
| Zea mays | |

In a preferred embodiment, intact seed to be utilized is heated prior to use to destroy, inhibit, prevent or otherwise retard sprouting capability. Sufficient loss of seed sprouting capability is usually achieved at 195° F. (90.5° C.) for 24 hours in a drying oven or autoclaving at 252° F. (121° C.) for 1.5 hours. The time and temperature parameters are interrelated and can be combined or varied. However, treatment of the seed is required that results in about a complete—or nearly complete—irreversible inhibition or destruction of sprouting capability of the seed, or achieves death of the embryo; and otherwise retains the structural integrity of the seeds; with the treated seeds having inherent delayed release properties when utilized as a nutrient supplement in the present invention.

Although the minimum time and temperature that is needed to effect the above described and desired physiological result is variable, 195° F. (90.5° C.) for 24 hours or 252° F. (121° C.) for 1.5 hours is generally effective, but variable time/temperature regimes may be required. When selecting such regimes, one must consider what quantity of seed is being treated since larger bulks of seed may require more extreme conditions to effectively and irreversibly inhibit or destroy sprouting capability. The invention may be broadly practiced by other physical or chemical treatments to discourage sprouting including, but not limited to: gamma irradiation, UV irradiation, microwaving (induction heating), ultrasound, micronizing and anti-sprouting chemical agents. Alternatively, genetically-sterile intact seeds could be used.

We have observed (Example 1) that if the intact seed that is utilized to practice the invention is allowed to sprout, then it will be a less effective supplement, presumably due to utilization of the nutrient reserve by the developing plant, rather than the mushroom fungus.

The mechanism of how the intact treated seed compositions of the invention achieve the objective of delayed-release of nutrients is not precisely known. However, as indicated earlier, the physical and/or physiological properties of the seed coat may impede the availability of the internal nutrient reserve to microorganisms external to the seed. For this reason, it is anticipated that the delayed-release mechanism of the intact seed might be enhanced further through coating the seed with hydrophilic or hydrophobic substances in order to alter, in an advantageous manner, the availability of the seed-stored nutrients.

Figure 4:
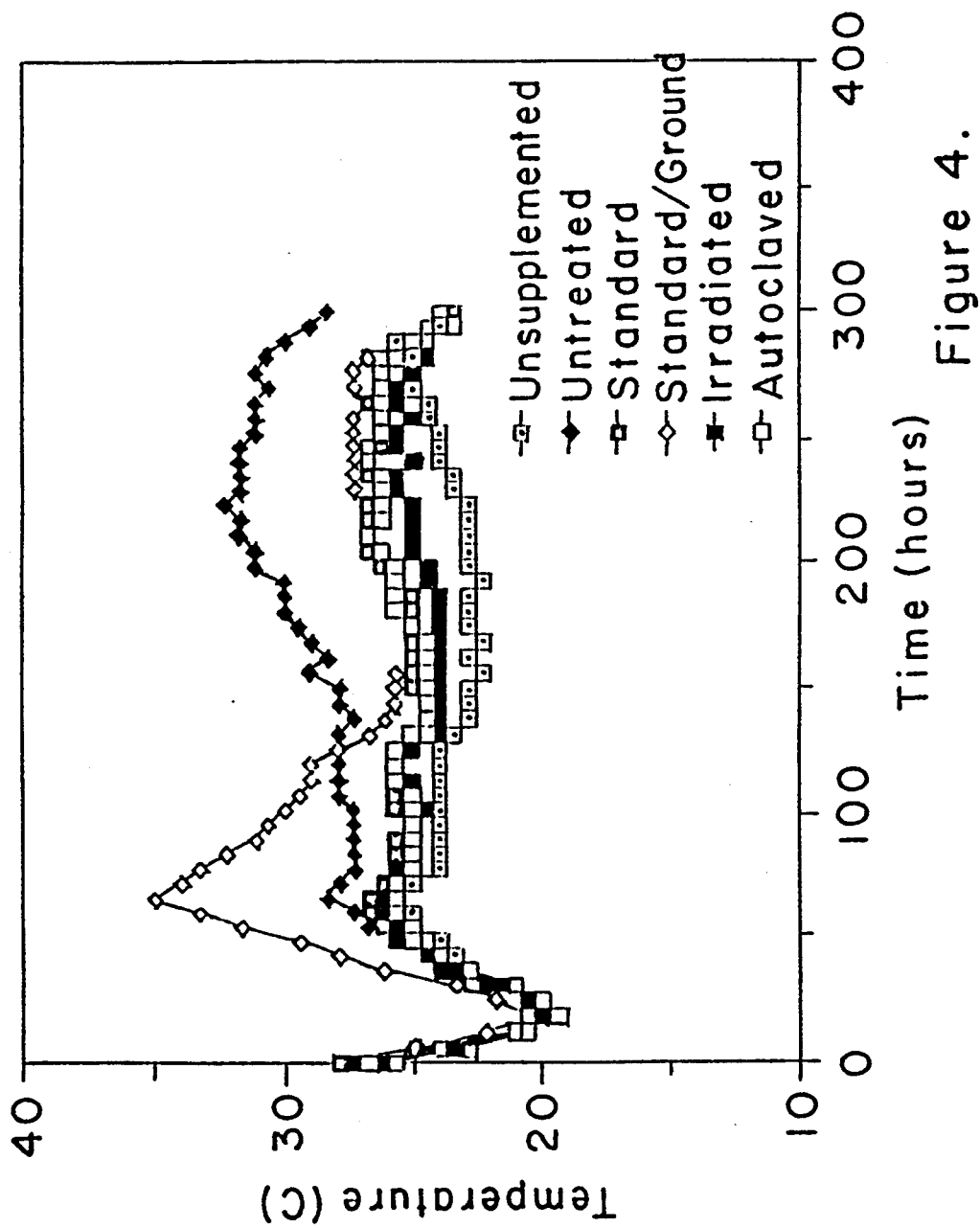

In any case, the seeds utilized in the present invention should be essentially intact because heat-treated seed, which is then crushed, as well as overheated seed (having a presumed loss integrity of the seed coat), have been found to lose their delayed-release property, as measured by the excessive evolution of heat in the compost during the spawn growth phase (FIG. 4). Thus, seed that has been subjected to a treatment according to the present invention (either physical chemical, or otherwise), and yet fail to promote an excessive overheating of the compost during spawn growth, should be considered to be "an intact seed."

Once the seed is properly conditioned to function as a nutrient supplement, the procedure for best implementing the supplement is the same as that used with other methods known in the art, namely, dispersing the supplement in growing media for commercial mushrooms. The various media appropriate for a particular fungus are known in the art including compost, straw, and wood or wood products (i.e., sawdust, wood chips, etc.). For *A. bisporus*, the supplement would be disseminated in compost, for Pleurotus spp. in straw, and for *Lentinula edodes* in sawdust, and so forth. The rate of application of the supplements of the invention would be similar to existing commercial supplements, in the range of approximately 2–25% on a dry weight basis of the compost. Optimization of the rate of application can be routinely determined by practitioners and a certain amount of variation may occur.

For *A. bisporus* and other commercial mushrooms, generally the treated seed composition of the invention can be introduced into the compost in an analagous fashion to existing commercial mushroom supplements. Practices common to the art of mushroom cultivation include addition of the supplement at the time of spawning [Schisler, L. C., "Influence of Cultural Practices on Mushroom Yield Response to Delayed-release Nutrients;" pp. 49–53 (1982); In: *"Penn Sae Handbook for Commercial Mushroom Growers.*, P. J. Wuest and G. D. Bengtson (eds.), The Pennsylvania State University, University Park, Pa., p.129] and at the time of casing [van Gils, J. J., "Cultivation," pp. 263–308 (1988); In: *The Cultivation of Mushrooms*, L. J. L. D. van Griensven (ed.), Darlington Mushroom Laboratories Ltd., Sussex, England and Somycel, S. A., Langeais, France, p. 515. Additionally, the supplement can be added during the mushroom production cycle as described by Schisler, L. C., 1990, *Applied Agricultural Research*, 5:44–47.

The invention is preferably practiced by using heat processing in the treatment of intact seeds. Such heat processing would consist of surrounding the seed with dry air in an electric forced-air convection oven or by micronizing, which is a dry heat from microwaves emitted from an infrared burner. Alternatively, a roasting technique could be used wherein the seed is heated to the desired temperature in a suitable oven for the proper period of time. The mechanism of roasting appears to increase the nutritive value of certain animal-feed seed species which may be utilized in the invention. It is also possible to utilize a new technology of batch and continuous blending and drying using equipment, for example, available from Patterson and Kelly Company wherein batch blenders are used to heat kill the seed. Autoclaving the seed (at 252° F. (121° C.) for about 1.5 hours) in a steam sterilizer may also be used.

The present invention can be adapted for use with many species, varieties, and strains of edible fungi including but not limited to:

| | |
|---|---|
| Agaricus spp. | Calvatia gigantea |
| Auricularia spp. | Flammulina velutipes |
| Boletus spp. | Lentinula edodes |
| Cantharellus spp. | Panoeolus venenosus |
| Morchella spp. | Philota namelco |
| Pleurotus spp. | Stropharia rugosa-annluata |
| | Tremeila fuciformis |
| | Volvariela volvacea |

Although the invention has been particularly described with respect to the preferred use of intact treated seeds (e.g., oilseeds, including rape particularly) or mixtures thereof as a nutrient supplement for amending the compost for the purpose of increasing the yield of mushrooms, other aspects of the invention include the idea of using these disclosed intact treated seeds in the production of mushroom spawn.

Mushroom spawn (viz. cereal grain colonized by mycelium of the mushroom fungus), is used to introduce the fungus into the compost as a prerequisite to the formation of mushrooms. Typically, the cereal grain is cooked in water to rupture the seed coat and make immediately available the carbohydrate-rich nutrient reserve for supporting mycelial growth of the mushroom fungus. In accordance with this aspect of the invention, intact treated seed, preferably an oilseed species, according to the present invention is used as a substrate for the fungal mycelium, either solely or as an addition to cereal grain. It is expected that utilizing the intact treated seeds of the present invention in this aspect of the invention will allow those skilled in the preparation of mushroom spawn to provide a substrate for introducing the fungus into the compost for the colonization phase of the cropping cycle (viz. spawn-run) and, at the same time, a nutrient supplement for significantly increasing the yield of mushrooms. Techniques that can be used to prepare mushroom spawn containing intact treated seeds according to the present invention as a substrate for the fungal mycelium, include those described by Fritsche, G., "Spawn: Properties and Preparation", pp. 91–99 (1988); In: *The Cultivation of Mushrooms*, L. J. L. D. van Griensven (ed.). Darlington Mushroom Laboratories Ltd., Sussex, England and Somycel S. A., Langeais, France, p. 515.

EXPERIMENTAL

In the following Examples, the present invention was evaluated for its effect on the production of mushrooms compared to the state-of-the-art commercial delayed-release supplements. Although these experiments utilize off-white hybrid varieties of *A. bisporus*, the compositions and methods of the invention can be used to cultivate other varieties of *A. bisporus* as well as diverse mushroom species. The following Examples also illustrate the usefulness of the invention under both pilot plant and commercial-scale growing conditions. These examples are offered to illustrate particular embodiments of the invention, but are not intended to be limitative thereof.

EXAMPLE 1

In this Example, the intact rapeseed supplement was dispersed in the compost at the time of spawning. This production trial was conducted at the pilot plant facility of The Pennsylvania State University known as the Mushroom Research Center (MRC). For each treatment, each of six 4 ft.$^2$ trays containing 50 lbs. fresh weight of compost were spawned with 110 grams of a commercial off-white hybrid strain of *A. bisporus*. In treatment 1, the compost was unsupplemented. In treatment 2, the compost in each tray was mixed with 1 lb. (7% based on the dry weight of compost) o the commercial supplement Spawn Mate II SE. In treatment 3, 0.5 lbs. (3.5% based on the dry weight of compost) of the commercial supplement Fast Break was mixed into the compost of each tray. In treatments 4 and 5, the compost in each tray was amended with 1 lb. (7% based on the dry weight of compost) and 2 lbs. (14% based on the dry weight of compost) of heated rapeseed supplement, respectively.

After a 13 day spawn growth period at approximately 25° C., the trays were cased with 1.5 inch thick layer of a mixture of peat and limestone and maintained at 25° C. during case hold and 18° C. during cropping.

It should be noted that in this experiment, the rapeseed was heated insufficiently to only 142° F. (60° C.) for 12 hours, so extensive sprouting of the seed occurred during the spawn growth and mushroom production phases of this crop. Aside from resulting in an unsightly appearance of rapeseed sprouts throughout the growing medium, we speculate that the developing seedling utilized much of the nutrient reserve within the seed such that the full stimulatory effect of the rapeseed supplement on the yield of mushrooms was not realized. As shown in Table 1 below, after six weeks (42 days) of production, the yield of mushrooms from compost amended with Spawn Mate II SE, Fast Break, and rapeseed at 2 lbs. per tray were statistically comparable and significantly higher than the yield obtained from unsupplemented compost. No stimulatory effect on yield was obtained with 1 lb. rate of rapeseed. This was probably related to loss of the nutrients associated with sprouting as discussed above.

TABLE I

| Treatment | Yield After Six Breaks (lbs/ft$^2$)* |
|---|---|
| Unsupplemented | 2.98 b |
| Spawn Mate II SE (7%) | 4.00 a |
| Fast Break (3/5%) | 4.05 a |
| Rapeseed (7%) | 3.15 b |
| Rapeseed (14%) | 3.81 a |
| Source of the supplements: | |
| Spawn Mate II SE (Spawn Mate, 1500 41st Ave., Capitola, CA.) | |
| Fast Break (Penford Products Co. of Cedar Rapids, IA) | |
| Rapeseed (Canola, Wilbur Ellis Co., Southwest Feed Division, Los Angeles, CA) Determined to be an unspecified mixture of canola varieties of *Brassica rapa* and *Brassica napus*. | |

*Numbers followed by the same letter are not significantly different by the Waller Duncan K-ratio t test, P = 0.05.

EXAMPLE 2

The objective of this experiment was identical to Example 1. However, here the rapeseed was treated at 195° F. (90.5° C.) for 24 hours in an electric, forced-air convection oven to more effectively destroy germination capability.

The cropping parameters were similar to Example 1, the Mushroom Research Center was used, six trays per treatment, each containing 50 lbs. fresh weight of compost, each spawned with 110 grams of a commercial off-white hybrid strain of A. bisporus. The supplements were mixed into the compost at the time of spawning. A 13 day spawn growth period at 25° C. was used. One difference between this example and Example 1 was that at the time of casing, shredded colonized compost was mixed into the casing material at the rate of 1 lb. per 10 ft.$^2$ of production bed before it was overlaid to the depth of 1.5 inches on each tray.

For each treatment, the temperature of the compost was recorded every four hours over the 13 day spawn growth phase. This was done to determine if the nutrients in the rapeseed were released too rapidly causing an excessive heating of the compost from high biological activity (i.e., other microorganisms utilizing the nutrients for their growth). This is an important consideration because excessive heating during the spawn growing period can directly affect the mushroom fungus and reduce the yield of mushrooms. As appears in FIG. 1, the temperature profiles of the compost that had been amended with rapeseed and the commercial delayed-release supplements, Spawn Mate II SE and Fast Break were similar in form and magnitude. Therefore, the delayed-release mechanism achieved with intact rapeseed closely paralleled that of commercial supplements consisting of chemically-treated processed seed by-products.

Figure 2:
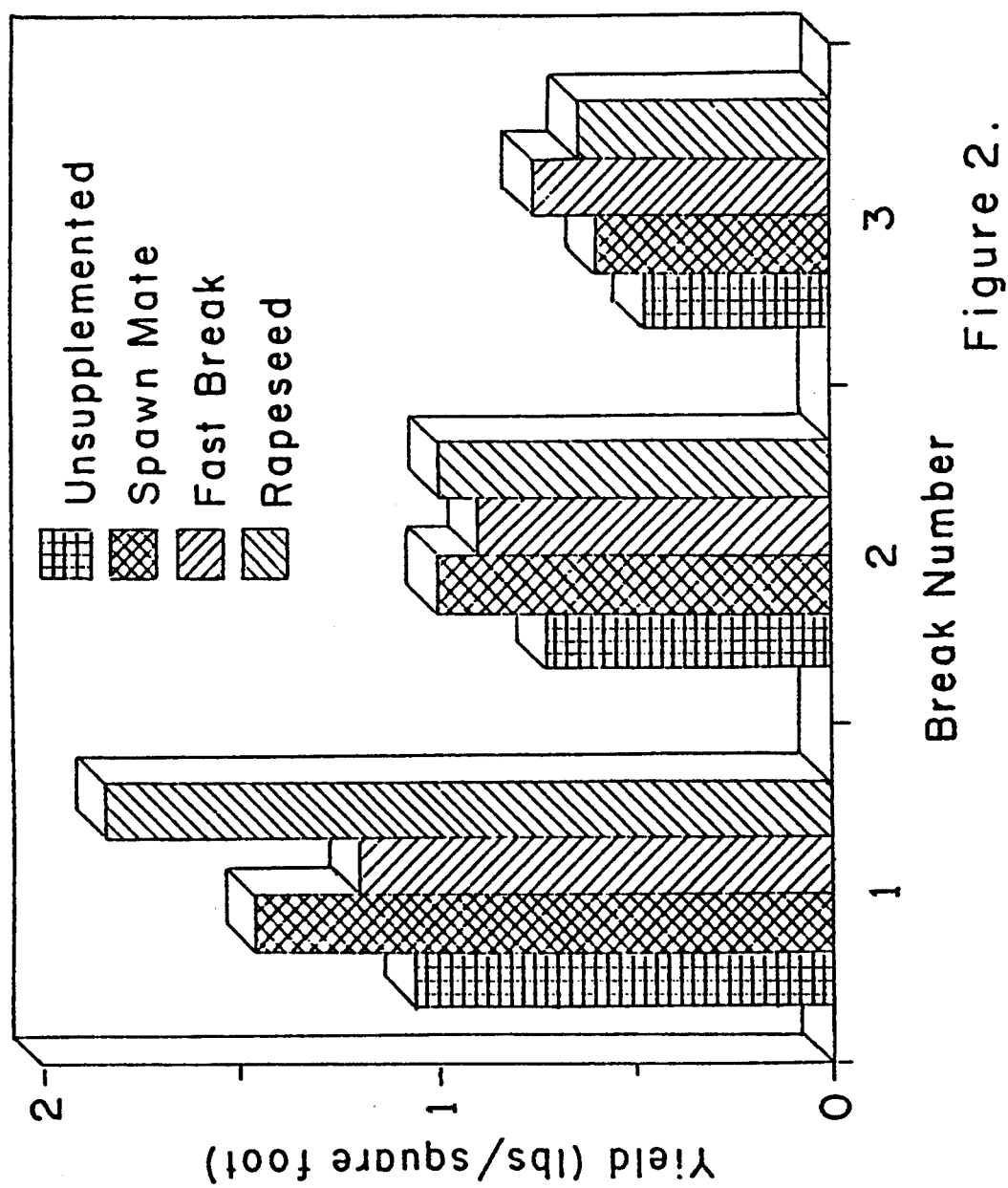

After four weeks (28 days) of production, the highest yield (3.58 lbs./ft.$^2$) was obtained with rapeseed supplement at 1 lb. per tray (7% dry weight basis of the compost) (Table II.). In this trial, yield with rapeseed supplement was statistically greater than with the commercial supplements Spawn Mate II SE at 1 lb. per tray (7% dry weight basis of the compost) and Fast Break at 0.5 lbs. per tray (3.5% dry weight basis). All supplements provided a significant increase in yield of mushrooms compared with the unamended compost treatment. FIG. 2 shows the yield of mushrooms at each break for the first three breaks. Addition of rapeseed to the compost at spawning increased yield at each of the first three breaks of mushrooms in a fashion similar to the commercially-available delayed release supplements Spawn Mate II SE and Fast Break.

Occasional sprouts of rapeseed were observed in the compost and throughout the casing layer, but the level was well within an acceptable range.

TABLE II

| Treatment | Yield After Four Breaks (lbs/ft$^2$)* |
|---|---|
| Unsupplemented | 2.32 c |
| Spawn Mate II SE (7%) | 3.12 b |
| Fast Break (3.5%) | 3.07 b |
| Rapeseed (7%) | 3.58 a |
| Source of the supplements: Same as Table I. | |

*Numbers followed by the same letter are not significantly different by the Waller Duncan K-ratio t test, P = 0.05.

EXAMPLE 3

This is another side-by-side test comparing the rapeseed supplement and commercial delayed-release supplements added to the compost at the time of spawning. The cropping trial was conducted at the Mushroom Research Center. Each treatment had 6 trays each containing 50 lbs. of compost, each spawned with 110 grams of a commercial off-white hybrid strain of A. bisporus. All other conditions for cropping were as described in example 2. The rapeseed was treated as in Example 2 to prevent germination capability.

Figure 3:
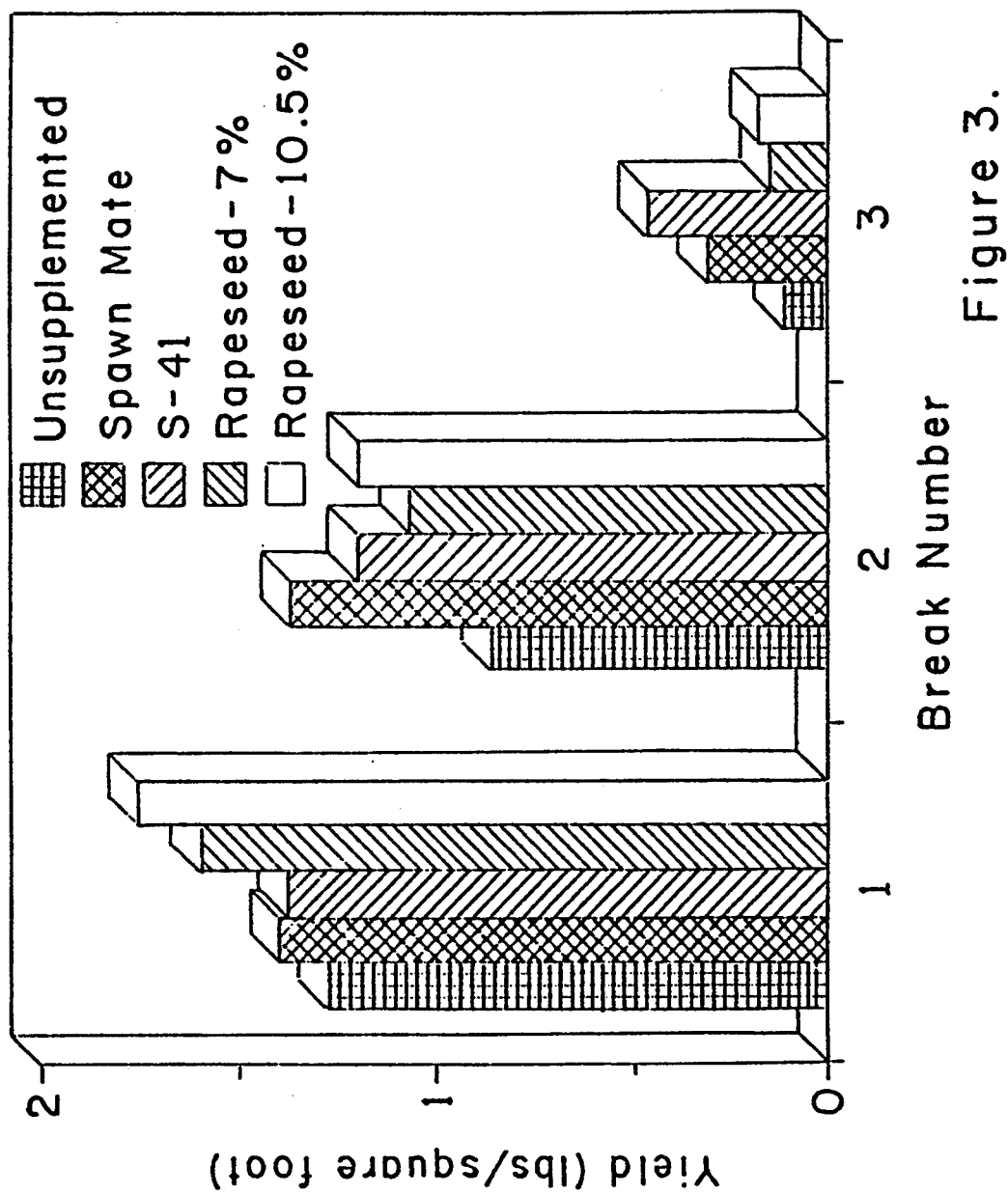

Table III reveals that after 4 breaks (28 days), the yield of mushrooms was comparable from compost amended at spawning with the commercial supplements Spawn Mate II SE at 1 lb. per tray (7% dry weight basis of the compost), S-41 at 0.75 lbs. per tray (5% dry weight basis of the compost), and rapeseed supplement at 1.5 lbs. per tray (10.5% dry weight basis of the compost). At the lower rate of rapeseed of 1 lb. per tray (7% dry weight basis of the compost), production of mushrooms was comparable to S-41 but lower than Spawn Mate II SE and rapeseed at the higher rate. All supplements, irrespective of their rate, increased the yield of mushrooms compared to the unamended compost control treatment. FIG. 3 depicts the yield of mushrooms at each break for the first three breaks of the cropping cycle. Rapeseed and the commercial delayed-release supplements increased yield of mushrooms at each break, however, rapeseed provided the greatest stimulatory effect during the first and second breaks.

TABLE III

| Treatment | Yield after Four Breaks (lbs/ft$^2$)* |
|---|---|
| Unsupplemented | 2.35 c |
| Spawn Mate II SE (7%) | 3.32 a |
| S-41 (5%) | 3.12 ab |
| Rapeseed (7%) | 2.84 b |
| Rapeseed (10.5%) | 3.29 a |
| Source of the supplements: | |
| Spawn Mate II SE and Rapeseed (Same as Table I) | |
| S-41 (Campbell Fresh Inc., P.O. Box 169, Blandon, PA). | |

*Numbers followed by the same letter are not significantly different by the Waller Duncan K-ratio t test, P = 0.05.

EXAMPLE 4

This is another evaluation of the invention as a supplement added to the compost at spawning. However, unlike the previous examples, this cropping trial was conducted according to commercial-scale growing conditions at the San Luis Rey Mushroom Farm, Bonsall, Calif. The rapeseed was treated as in Example 2.

The compost was prepared from a mixture of horse and chicken manures, cotton seed hulls, and cotton seed meal by standard practices. The compost was spawned with a commercial off-white hybrid strain of A. bisporus at the rate of 1 unit per 7 ft.$^2$ of production bed. With the exception of 120 ft.$^2$ area of the production bed, the compost was amended at spawning with Spawn Mate II SE at the rate of 7% (based upon 8 lbs. per ft.$^2$ dry weight of compost at spawning), the remaining 120 ft.$^2$ of production area was amended at spawning with 7% rapeseed calculated on a dry weight basis of the compost. After an 18 day spawn growth period at 25° C., the spawn-runned compost was cased with a 1.5 inch thick layer of a mixture containing peat, sugar beet waste, calcium carbonate, and shredded colonized compost to provide 1 lb. per 10 ft.$^2$ of production bed. Results of this Example are presented in Table IV below.

TABLE IV

| | Yield lbs./ft.² at | | | | |
|---|---|---|---|---|---|
| Treatment | Break 1 | Break 2 | Break 3 | Break 4 | Total |
| Rapeseed (7%) | 2.92 | 2.00 | 1.01 | 0.30 | 6.23 |
| Spawn Mate II SE (7%) | 3.11 | 1.88 | 0.99 | 0.25 | 6.23 |

Source of supplements: Same as Table 1.

During the spawn growth phase, the average temperature of the compost was 78° F. and 80° F. (25.6° C. and 26.7° C.) for the rapeseed and Spawn Mate II SE treatments, respectively. For each treatment, the peak of biological activity in the compost based on temperature occurred on day 13 of spawn run. Similarly, the average temperature of the compost during case hold was 79° F. and 78° F. (26.1° C. and 25.6° C.) for rapeseed supplement and Spawn Mate II SE, respectively.

After 4 breaks (28 days), yield of mushroom from the compost supplemented with either rapeseed or the commercial supplement Spawn Mate II SE was identical at 6.23 lbs./ft.². No differences in size and quality of the mushrooms existed between the treatments.

EXAMPLE 5

In this example, different methods of seed treatment were tested for their effect on sprouting and the delayed-release mechanism. The following seed treatments were used: no treatment ("Untreated"), 195° C. (90.5° C.) for 24 hours in an electric forced-air convection oven ("Standard"), 2.5 megarads of gamma irradiation ("Irradiated"), and autoclaved at 252° F. (121° C.) for 1.5 hours in plastic bags in a steam sterilizer ("Autoclaved").

It was found that untreated rapeseed had an 82% rate of germination (Table V). Treatments of either 195° F. for 24 hours, 2.5 megarads of gamma irradiation, or 252° F. for 1.5 hours, rendered the seed completely devoid of germination capability.

TABLE V

| Seed Treatment | Number of Seed Germination/Number of Seed Tested | % Viability[b] |
|---|---|---|
| Untreated[a] | 41/50 | 82 |
| Standard[c] | 0/50 | 0 |
| Irradiated[d] | 0/50 | 0 |
| Autoclaved[e] | 0/50 | 0 |

[a]No treatment was used to discourage sprouting
[b]Number of seed germinated divided by number of seed tested × 100
[c]195° F. (90.5° C.) for 24 hours
[d]2.5 megarads of gamma irradiation
[e]252° F. (121° C.) for 1.5 hours The variously-treated rapeseed was evaluated as a delayed-release supplement in a mushroom production trial. The parameters for cropping were as described in Example 2 above. For all treatments, the compost was amended at spawning with 7% rapeseed (on a dry weight basis of the compost). During the 13-day spawn growth period, the temperature of the compost for each treatment was monitored at 6-hour intervals.

The temperature profiles of the compost during spawn run were similar for the standard-treated, gamma-irradiated, and autoclaved rapeseed, all indicating a slight evolution of heat compared to unsupplemented compost (FIG. 4). In contrast, seed treated in the standard fashion at 195° F. for 24 hours in an electric, forced-air convection oven, but then ground to a powder ("Standard/Ground"), produced a dramatic rise in the compost temperature on days 2 and 3. Untreated seed, which showed extensive sprouting during the spawn run period, created a gradual rise in the temperature of the compost. This latter increase was attributed to biological heat associated with the germination of the seed and growth of the seedling.

After four breaks, yields of mushroom from compost supplemented with rapeseed, which either had been heated in a forced-air convection oven, autoclaved, or gamma-irradiated, were similar (3.54 to 3.81 lbs./ft.²) and markedly higher than unsupplemented compost (2.69 lbs./ft.²) (Table VI). Untreated rapeseed, which sprouted, provided a less stimulatory effect on yield.

TABLE VI

| Treatment | Yield After Four Breaks (lbs/ft²) |
|---|---|
| Unsupplemented | 2.69 d |
| Rapeseed-Untreated[a] | 3.17 c |
| Rapeseed-Standard[b] | 3.59 ab |
| Rapeseed-Irradiated[c] | 3.54 b |
| Rapeseed-Autoclaved[d] | 3.81 a |

For each treatment, rapeseed was used at the rate of 7% on a dry weight basis of the compost.
Source of the rapeseed: Canola, Wilbur Ellis Co., Southwest Feed Division, Los Angeles, CA. Determined to be an unspecified mixture of canola varieties of *Brassica rapa* and *Brassica napus*.

[a]No treatment was used to discourage sprouting
[b]195° F. (90.5° C.) for 24 hours
[c]2.5 megarads of gamma irradiation
[d]252° F. (121° C.) for 1.5 hours
*Numbers followed by the same letter are not significantly different by the Waller-Duncan K-ratio t test. P= 0.05

Several conclusions can be drawn from this experiment. First, seed undergoing sprouting is a less effective supplement, most likely due to utilization for the nutrient reserve within the seed by the developing seedling, instead of the mushroom fungus. Second, both heat-based and nonheat-based (irradiation) methods for discouraging sprouting can be used to prepare seed as a delayed-release supplement for the cultivation of mushrooms. Thus, heating per se is not essential to the delayed-release mechanism, but only acts to kill the embryo or otherwise inhibit seed sprouting. Third, heated seed that was pulverized to destroy the integrity of the seed coat, caused an excessive evolution of heat in the compost. The nutrient within the seed was available to microorganisms in the compost, which was evidenced by extensive molding of the compost during the spawn growth period. Thus, an essentially intact seed coat is apparently essential in the delayed-release response of the invention.

EXAMPLE 6

The objective of this experiment was to compare the nutrient supplementing capacity of varieties of rape for mushroom cultivation. The cropping conditions were similiar to Example 2, the Mushroom Research Center was used; there were five trays per treatment, each tray contained 50 lbs. fresh weight of compost, each was spawned with 110g of commercial spawn of A. bisporus, and each was CAC-cased as described previously. Supplements were mixed into the compost at the time of spawning.

It was found that with an increase in the rate of rapeseed supplement (unspecified mixture of canola varieties of *B. rapa* and *B. napus*) from 1 lb to 2 lbs per tray, mushroom yield increased significantly (Table VII). Also, 'Glacier' canola variety of *B. napus* and the mixture of canola varieties of *B. rapa* and *B. napus* were equally effective supplements. At a rate of 1 lb. per tray, rape and the formaldehyde-based Spawn Mate II SE stimulated yield to the same extent.

TABLE VII

| Treatment | Mushroom Yield After Four Weeks (lbs/ft$^2$)* |
|---|---|
| Unsupplemented compost (control) | 2.59 d |
| Spawn Mate II SE[a] (1 lb) | 3.30 c |
| Rape[b] (1 lb) | 3.45 c |
| Rape[b] (1.5 lbs) | 3.99 b |
| Rape[b] (2 lbs) | 4.40 a |
| Rape[c] (1 lb) | 3.44 c |

[a] Spawn Mate Co., Inc., 1500 41st Avenue, Capitola, CA.
[b] Wilbur Ellis Co., Southwest Feed Division, Los Angeles, CA. Determined to be an unspecified mixture of canola varieties of *Brassica rapa* and *B. napus*.
[c] Agway, Inc., P.O. Box 4933, Syracuse, NY. Canola variety 'Glacier' of *B. napus*.
*Numbers followed by the same letter are not significantly different by the Waller Duncan K-ratio t test, P = 0.05.

EXAMPLE 7

The object of this experiment was to compare the nutrient supplementing capacity of several varieties of rape for mushroom cultivation. The experimental parameters for the crop trial were essentially as described in Example 6.

We found that the mixture of canola varieties of *B. rapa* and *B. napus* and canola variety 'Glacier' of *B. napus* were equally effective supplements for mushroom production (Table VIII). Canola variety 'Laborius' of *B. napus* had a lower supplementing capacity than the other canola varieties. The mixture of the canola varieties and the variety 'Laborius', when used at a rate of 1.5 lbs/tray, increased yield to the same extent as Spawn Mate II SE and S-41 used at a rate of 1 lb/tray and 0.75 lb tray, respectively.

TABLE VIII

| Treatment | Mushroom Yield After Four Weeks (lbs/ft$^2$)* |
|---|---|
| Unsupplemented compost (control) | 2.52 c |
| Spawn Mate II SE[a](1 lb) | 3.63 a |
| S-41[b] (0.75 lb) | 3.76 a |
| Rape[c] (1.5 lbs) | 3.81 a |
| Rape[d] (1.5 lbs) | 2.89 b |
| Rape[e] (1.5 lbs) | 3.58 a |

[a] Spawn Mate Co., Inc., 1500 41st Avenue, Capitola, CA.
[b] Campbell's Fresh Inc., Box 169, Blandon, PA.
[c] Wilbur Ellis Co., Southwest Feed Division, Los Angeles, CA. Determined to be an unspecified mixture of canola varieties of *Brassica rapa* and *B. napus*.
[d] Agway, Inc., P.O. Box 4933, Syracuse, NY. Canola variety of 'Laborious' of *B. napus*.
[e] Agway, Inc., Canola variety 'Glacier' of *B. napus*.
*Numbers followed by the same letter are not significantly different by the Waller Duncan K-ratio t test, P = 0.05.

EXAMPLE 8

The purpose of this experiment was to compare the delayed-release nutrient supplementing capacity of two species of rape, *Brassica rapa* and *Brassica napus*. The experimental cropping conditions were essentially identical to those used in Example 6 except 130 g of spawn was mixed into each tray.

The canola variety 'Reward' of *Brassia rapa* and the canola variety 'Glacier' of *B. napus* as well as the undesignated mixture of canola varieties of the two species were effective delayed-release nutrient supplements for mushroom production (Table IX). Canola variety 'Reward' was the most effective supplement. In agreement with the findings of Example 7, canola variety 'Laborius' was an ineffective supplement.

TABLE IX

| Treatment | Mushroom Yield After Four Weeks (lbs/ft$^2$)* |
|---|---|
| Unsupplemented compost (control) | 2.18 c |
| Spawn Mate II SE[b] (1 lb) | 2.88 b |
| Rape[c] (mixture of *B.rapa* and *B.napus*) | 2.89 b |
| Rape[c] (*B. rapa* 'Reward') | 3.38 a |
| Rape[d] (*B. napus* 'Laborius') | 2.26 c |
| Rape[d] (*B. napus* 'Glacier') | 2.80 b |

[a] All supplements were used at the rate of 1 lb/tray.
[b] Spawn Mate Co., Inc., 1500 41st Avenue, Capitola, CA.
[c] Wilbur Ellis Co., Southwest Feed Division, Los Angeles, CA.
[d] Agway, Inc., P.O. Box 4933, Syracuse, NY.
*Numbers followed by the same letter are not significantly different by the Waller Duncan K-ratio t test, P = 0.05.

EXAMPLE 9

The object of this experiment was to compare the delayed-release nutrient supplementing capacity of the intact seed of several plant species for mushroom cultivation. Cropping parameter were essentially as described for EXAMPLE 6 except there were three replicate trays per treatment.

Several oilseed species or closely-allied species, specifically flax, rape, mustard, radish, oil sunflower, cabbage, and sesame, increased yield of mushrooms at a statistically comparable level to the formaldehyde-based commercial supplement, Spawn Mate II SE (Table X). Four of the seven plant species, namely rape, mustard, radish, and cabbage, which increased mushroom yield on a par with Spawn Mate II SE, belong to the plant family Brassicaceae (mustard family). Oilseed species soybean, niger, and cotton were less effective delayed-release nutrient supplements, while oilseed species corn and safflower failed to increase yield. Cereal species, rye and millet, were lowly or non-stimulatory nutrient supplements.

TABLE X

| Treatment | Mushroom Yield After Four Weeks (lbs/ft$^2$)* |
|---|---|
| Flax (*Linum usitatissimum*)[b] | 3.81 a |
| Rape (*Brassica rapa*)[c] | 3.79 ab |
| Mustard (*Brassica juncea*)[d] | 3.58 abc |
| Spawn Mate II SE[e] | 3.46 abcd |
| Radish (*Raphanus sativus*)[b] | 3.42 bcde |
| Oil Sunflower (*Helianthus annuus*)[d] | 3.26 cdef |
| Cabbage (*Brassica oleracea*)[b] | 3.16 defg |
| Sesame (*Sesamum indicum*)[f] | 3.13 defg |
| Soybean (*Glycine max*)[b] | 3.07 efg |
| Niger (*Guizotia abyssinica*)[d] | 3.01 fgh |
| Rye (*Secale cereale*)[g] | 2.91 fghi |
| Cotton (*Gossypium hirsutum*)[h] | 2.87 ghi |
| Millet (*Panicum miliaceum*)[d] | 2.67 hij |
| Corn (*Zea mays*)[d] | 2.60 ijk |
| Unsupplemented (control) | 2.42 jk |
| Safflower (*Carthamus tinctorius*)[d] | 2.29 k |

[a] All supplements were used at a rate of 1 lb/tray.
[b] Agway, Inc., P.O. Box 4933, Syracuse, NY.
[c] Wilbur Ellis Co., Southwest Feed Division, Los Angeles, CA. Canola variety 'Reward'.
[d] Mifflinburg Farm Exchange, Inc., Mifflinburg, PA.
[e] Spawn Mate Co., Inc., 1500 41st Avenue, Capitola, CA.
[f] Pennington Seed Co., Madison, GA.
[g] Stanford Seed Co., Denver, PA.
[h] Delta and Pineland Co., Scott, MI.
*Numbers followed by the same letter are not significantly different by the Waller Duncan K-ratio t test, P = 0.05.

EXAMPLE 10

The purpose of this experiment was to evaluate the supplementing capacity of rapeseed and the chemical-based commercial supplement Spawn Mate II SE. Experimental conditions were essentially as outlined for Example 6 except each tray was spawned with 130 g of spawn and there were four replicate trays per treatment.

As shown in Table XI, increasing the rate of supplementation with intact seed of rape from 0.53 to 1.10 lbs/tray resulted in a corresponding increase in yield of mushrooms. Using rapeseed, all rates of supplementation tested provided a significant increase in yield compared to unsupplemented compost. In contrast, only the highest rate (1.1 lbs/tray) of Spawn Mate II SE significantly increased yield of mushrooms compared to unsupplemented compost.

TABLE XI

| Treatment | Mushroom Yield After Four Weeks (lbs/ft$^2$)* |
|---|---|
| Unsupplemented compost (control) | 2.81 c |
| Spawn Mate II SE$^a$ | |
| 0.53 lbs | 2.85 c |
| 0.74 lbs | 2.92 c |
| 1.10 lbs | 3.68 b |
| Rape$^b$ | |
| 0.53 lbs | 3.40 b |
| 0.74 lbs | 3.70 b |
| 1.10 lbs | 4.14 a |

$^a$Spawn Mate Co., Inc., 1500 41st Avenue, Capitola, CA.
$^b$Wilbur Ellis Co., Southwest Feed Division, Los Angeles, CA. Canola variety 'Reward' of *Brassica rapa*.
*Numbers followed by the same letter are not significantly different by the Waller Duncan K-ratio t test, P = 0.05.

EXAMPLE 11

This is another experiment in which the supplementing capacity of rapeseed and the chemical-based commercial supplement Spawn Mate II SE was compared. The experimental cropping parameters were similar to those outlined for Example 6 except each tray was spawned with 120 g of spawn and there were four replicate trays per treatment.

The canola varieties 'Reward' and 'Parkland' of *B. rapa* and Spawn Mate II SE were equally effective nutrient supplements (Table XII). All three supplements provided a comparably significant increase in yield relative to unsupplemented compost.

TABLE XII

| Treatment | Mushroom Yield After Four Weeks (lbs/ft$^2$)* |
|---|---|
| Unsupplemented compost (control) | 2.58 b |
| Spawn Mate II SE$^b$ | 3.13 a |
| Rape$^c$ | 3.35 a |
| Rape$^d$ | 3.23 a |

$^a$All supplements used at a rate of 0.74 lbs/tray.
$^b$Spawn Mate Co., Inc., 1500 41st Avenue, Capitola, CA.
$^c$Wilbur Ellis Co., Southwest Feed Division, Los Angeles, CA. Canola variety 'Reward' of *Brassica rapa*.
$^d$Agricultural Canada Research Station, 107 Science Crescent, Saskatoon, Saskatchewan, Canada. Canola variety 'Parkland' of *Brassica rapa*.
*Numbers followed by the same letter are not significantly different by the Waller Duncan K-ratio t test, P = 0.05.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. Each of the publications and patents referred herein above are expressly incorporated herein by reference in their entirety.

What is claimed is:

1. In a method of cultivating mushrooms wherein a time delayed-release nutrient supplement is utilized therein, the improvement comprising:
   using as the supplement an intact seed having its sprouting capability irreversibly inhibited or destroyed, or mixtures thereof, having inherent delayed-release properties.

2. The method of claim 1, wherein the intact seed is capable of releasing its nutrient reserve within a period of about 3 weeks in the method recited.

3. The method of claim 1, wherein the intact seed is of an oilseed species, or an allied seed species thereof, selected from the group consisting of flax, rape, mustard, radish, sunflower, cabbage, sesame, soybean, niger, cotton, corn, safflower, and mixtures thereof.

4. The method of claim 3, wherein the intact seed is capable of releasing its nutrient reserve within a period of about 3 weeks in the method recited.

5. The method of claim 1, wherein the intact seed is a rapeseed which is capable of releasing its nutrient reserve within a period of about 3 weeks in the method recited.

6. The method of claim 5, wherein the rapeseed is a CANOLA variety.

7. The method of claim 1, wherein the intact seed is of a seed species selected from the group consisting of:
   *Brassica adpressa, B. campestris, B. carinata, B. chinensis, B. fruticulosa, B. hirta, B. integrifolia, B. juncea, B. napus, B. nigra, B. oleracea, B. tournefortii, Calendulm officinalis, Camelina sativa, Centranthus macrosiphon, Ceratotheca sesamoides, Crepis alpina, Dimorphotheca plurialis, Diplotaxis erocoides, Eruca sativa, Impatiens balsamina, Lesguerella fendler, Limnanthes alba, Medicago sativum, Olea european, Raphanus sativus, Sesamum avernsis, Sinopis alba, Zea mays*, and mixtures thereof.

8. The method of claim 1, wherein the intact seed is of a seed species selected from the group consisting of:
   Arachis spp., Carthamus spp., Crambe spp., Cuphea spp., Elaeis spp., Euphorbia spp., Glycine spp., Gossypium spp., Guizotia spp., Helianthus spp., Linum spp., Papaver spp., Ricinus spp., Sesamum spp., Simmondsia spp., and mixtures thereof.

9. The method of claim 1, wherein the intact seed is subjected to an irreversible sprout inhibiting treatment selected from the group consisting essentially of:
   dry heating, autoclaving, gamma irradiating, ultraviolet irradiating, microwaving, micronizing, treating with ultrasound, treating with anti-sprouting chemical agents, breeding or incorporating genetic sterility, and mixtures thereof.

10. The method of claim 1, wherein the intact seed is subjected to an irreversible sprout inhibiting treatment, comprising heating the intact seed at about 195° F. for about 24 hours.

11. The method of claim 1, wherein the intact seed is subjected to an irreversible sprout inhibiting treatment, comprising autoclaving the intact seed at about 252° F. for about 1.5 hours.

12. The method of claim 1, wherein the supplement is used at spawning.

13. The method of claim 1, wherein the supplement is used at casing.

14. The method of claim 1, wherein the supplement is used during the mushroom production cycle.

15. The method of claim 1, wherein the supplement is used for cultivation of a mushroom species selected from the group consisting of:
Calvatia gigantea,
Flammulina velutipes,
Lentinula edodes,
Panoeolus venenosus,
Philota namelco,
Strophari rugosa-annluata,
Tremeila fuciformis,
Volvariela volvacea, and
mixtures thereof.

16. The method of claim 1, wherein the supplement is used for cultivation of a mushroom species selected from the group consisting of:
Agaricus spp.,
Auricularia spp.,
Boletus spp.,
Cantharellus spp.,
Morchella spp.,
Pleurotus spp, and
mixtures thereof.

17. The method of claim 1, wherein the supplement is used for increasing the rate of mycelial growth in the compost.

18. The method of claim 1, wherein the supplement is used to increase the rate of mycelial growth in the casing.

19. The method of claim 1, wherein the supplement is used to increase the yield of mushrooms.

20. In a method of producing mushroom spawn wherein a cereal grain is generally colonized by a fungal mycelium to introduce the fungus into the compost in the formation of mushrooms, the improvement comprising:
using as a substrate for the spawn, an intact seed having its sprouting capabilities irreversibly inhibited or destroyed, or mixtures thereof, having inherent delayed-release properties;
wherein the intact seed is of an oilseed species, or an allied. seed species thereof, selected from the group consisting of flax, rape, mustard, radish, sunflower, cabbage, sesame, soybean, niger, cotton, corn, safflower, and mixtures thereof.

21. The method of claim 20, wherein the intact seed is an amendment to the cereal grain.

22. The method of claim 20, wherein the intact seed is capable of releasing its nutrient reserve within a period of about 3 weeks in the method recited.

23. The method of claim 20, wherein the intact seed is rapeseed.

24. The method of claim 23, wherein the rapeseed is capable of releasing its nutrient reserve within a period of about 3 weeks in the method recited.

25. The method of claim 23, wherein the rapeseed is a CANOLA variety.

26. The method of claim 1, wherein the intact seed is coated with a hydrophobic substance in order to enhance the delayed-release of the nutrient reserve therein.

27. The method of claim 1, wherein the intact seed is coated with a hydrophilic substance in order to enhance the delayed-release of the nutrient reserve therein.

28. The method of claim 20, wherein the intact seed is coated with a hydrophobic substance in order to enhance the delayed-release of the nutrient reserve therein.

29. The method of claim 20, wherein the intact seed is coated with a hydrophilic substance in order to enhance the delayed-release of the nutrient reserve therein.

* * * * *